United States Patent
Kusumo-Rahardjo et al.

(10) Patent No.: US 6,459,430 B1
(45) Date of Patent: Oct. 1, 2002

(54) SYSTEM AND METHOD FOR IMPLEMENTING MULTI-LEVEL RESOLUTION CONVERSION USING MODIFIED LINEAR INTERPOLATION

(75) Inventors: Winarto Kusumo-Rahardjo, Irvine, CA (US); Larry M. Allen, Anaheim, CA (US)

(73) Assignees: Conexant Systems, Inc., Newport Beach, CA (US); Brooktree Corporation, Newport Beach, CA (US); Brooktree Worldwide Sales Corporation, Newport Beach, CA (US); Conexant Systems Worldwide, Inc., Newport Beach, CA (US)

( * ) Notice: Subject to any disclaimer, the term of this patent is extended or adjusted under 35 U.S.C. 154(b) by 0 days.

(21) Appl. No.: 09/251,696

(22) Filed: Feb. 17, 1999

(51) Int. Cl.[7] .............................. G09G 5/00; G06T 3/40
(52) U.S. Cl. ......................... 345/428; 345/667; 345/698
(58) Field of Search ................................. 345/127, 428, 345/132, 435, 667, 698

(56) References Cited

U.S. PATENT DOCUMENTS

| | | | |
|---|---|---|---|
| 4,785,818 A | * 11/1988 | Hardin | 128/660.67 |
| 5,339,368 A | * 8/1994 | Higgins-Luthman et al. | 382/56 |
| 5,481,275 A | * 1/1996 | Mical et al. | 345/132 |
| 6,028,585 A | * 2/2000 | Ishii et al. | 345/132 |
| 6,043,802 A | * 3/2000 | Gormish | 345/127 |
| 6,151,002 A | * 11/2000 | Kim | 345/87 |
| 6,304,268 B1 | * 10/2001 | Iourcha et al. | 345/128 |

OTHER PUBLICATIONS

Foley et al., Computer Graphics: Principles and Practice, Addison–Wesley Publishing Company, pp. 840–846.*

* cited by examiner

Primary Examiner—Jeffery Brier (57) ABSTRACT

A system and method for implementing multi-level resolution conversion (MLRC) of a set of image pixels efficiently using linear interpolation. The system automatically generates equations for determining the values of output pixels in a real-time manner as a function of the input pixels and a desired resolution conversion. As the input pixel values are received, the MLRC system generates the pixel values in real-time at a rate required for the output resolution without requiring a large number of intermediate complex calculations to be stored in memory. The pixel values utilized in the equations are normalized and scaled to values within a predetermined normalization range in order to minimize the complexity of the calculations performed by the MLRC system. The method of implementing MLRC allows the system to be implemented in an efficient and economical manner by eliminating the continual use of a floating point divider, minimizing the amount of memory required to perform the resolution conversion, and simplifying the calculations necessary for performing the resolution conversion.

4 Claims, 8 Drawing Sheets

SYSTEM AND METHOD FOR IMPLEMENTING MULTI-LEVEL RESOLUTION CONVERSION USING MODIFIED LINEAR INTERPOLATION

A portion of the disclosure of this patent document contains material which is subject copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND OF THE INVENTION

1. Field of the Invention

The present invention relates generally to a system and method for scaling image resolution conversion, and specifically to a system and method for implementing multi-level image resolution conversion efficiently using linear interpolation.

2. Description of Related Art

A wide variety of applications today utilize digital images, where many of these applications have different resolution requirements. In order to perform several applications using the same digital image, the resolution of the digital image must be converted between the resolution requirements of the various applications. Some multi-function peripheral devices have been developed for performing several of these digital image applications, such as scanning, storing, copying, faxing, and printing images. In performing these functions, the resolution required for each of these applications is typically different from the other applications. For instance, the resolution of scanner, printer, and fax standards are typically quite different. International standards define the resolution of faxed documents, while scanners and printers often possess resolutions which are a function of the individual capabilities of the respective devices. In order to support applications having varying resolution requirements, it is necessary to perform resolution conversion between the multiple applications. It is common for a scanner to have a resolution of 300 dpi, while some printers have resolutions of 600 dpi. In order to make the printed image the same size as the image scanned by the scanner, a resolution conversion of 300 dpi to 600 dpi is required.

Scaling methods are utilized to perform this resolution conversion in order to scale the size of an image between respective applications. Previous scaling methods have included the use of a fixed ratio of resolution conversion between an input resolution and an output resolution. For instance, a 1280×1280 pixel input box could be scaled down to a 640×640 pixel output box. Other scaling methods have further used a set of fixed resolution conversions, wherein a user may select a desired scaling of an image from a set of predetermined resolutions incremented in steps, such as image size reductions of 90%, 80%, 70%, etc. These prior scaling methods were limited to predefined incremental steps and did not allow a user to variably select the resolution conversion to more precise values depending upon the needs of the user.

Figure 1:
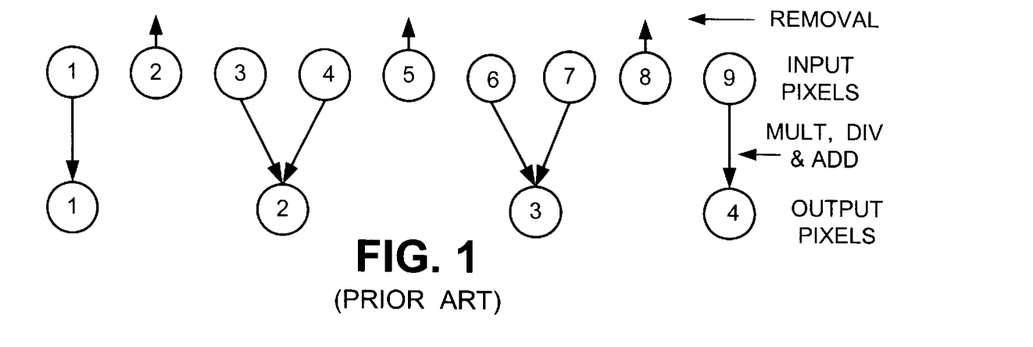
FIG. 1 shows an example of a conventional image scaling technique utilizing a linear interpolation scaling algorithm.

Several scaling methods have been developed to provide a variably selectable resolution conversion, where the particular resolution conversion selected is a function of the number of input pixels and the number of output pixels. One such scaling method is the nearest neighbor algorithm, where each output pixel is mapped from its closest neighboring input pixel. The closest neighbor is determined as a function of the spacing between the input pixels and the spacing between the output pixels. After the input pixels have been mapped to output pixels using the closest neighbor algorithm, all remaining unmapped input pixels which do not closely neighbor an output pixel are removed. These deleted input pixels create image distortion and aliasing in the output image. Another scaling method known as linear interpolation improves on the nearest neighbor algorithm by forming every output pixel as a weighted average of the two closest respective input pixels. An example of linear interpolation scaling is shown in FIG. 1. Linear interpolation scaling prevents pixel dropping for certain scaling factors above 50%. However, for resolution conversions less than 50%, linear interpolation degenerates into the closest neighbor algorithm where certain input pixels are deleted. As can be seen from FIG. 1, input pixels 2, 5, and 8 do not contribute to the output pixels when converting from nine input pixels to four output pixels. Thus, aliasing and distortion problems also arise with certain applications of the linear interpolation scaling method.

Figure 2:
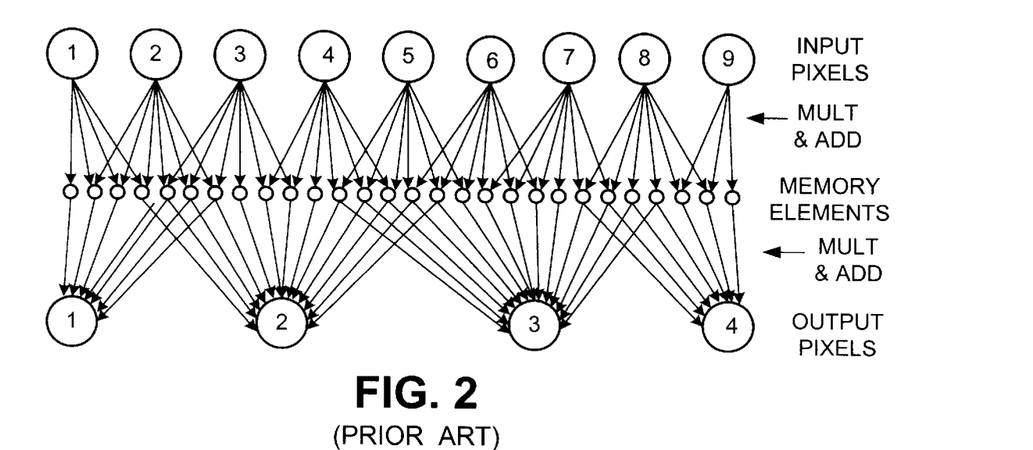
FIG. 2 shows an example of a conventional image scaling technique utilizing a DSP scaling algorithm.

In order to perform resolution conversion for all resize factors without information loss through pixel dropping, each input pixel from an image must contribute to the output pixels. One such lossless technique is known as 'textbook correct' scaling or DSP scaling, where multi-rate digital signal processing is used to perform the scaling. FIG. 2 illustrates an example of DSP scaling, where nine input pixels are scaled down to four output pixels. Initially, a set of upsampled pixels are generated from the input pixels using an interpolator, where each input pixel is multiplied by a coefficient value and added together with other values. The resulting upsampled pixel values are then stored in memory elements. Filtering and decimation is then performed on the upsampled pixel values to generate the output pixels. A decimator multiplies the upsampled pixels by a set number of coefficients called filter taps and sums the products to produce a single output pixel. The decimator coefficients are calculated based upon DSP theory to produce output pixels with minimal aliasing.

While the DSP scaling method minimizes aliasing for any resize factor, there are also several drawbacks of the DSP scaling method. The first drawback is caused by the directly proportional relationship of the resize factor to the number of upsampled pixels. For example, if a user wanted to resize 1000 pixels down to 999 pixels, then almost one million upsampled pixels are required to be generated in real time with each one of these upsampled pixels being stored in a memory element. Thus, a great deal of memory is required to store the upsampled pixels as well as requiring fast clock cycles to pipeline the upsampling process in a real-time manner. Another problem results from the large number of decimator coefficients that are required to be calculated for each resize factor, because calculating decimator coefficients for every resize factor is difficult and expensive to implement in hardware. Thus, the resolution conversion achieved by the DSP scaling method depends upon the number of memory elements available and the number of calculations performed, resulting in a large amount of computational complexity, processing time, and memory required to produce unaliased output pixels through DSP scaling.

There is clearly a need for a system and method for implementing multi-level image resolution conversion to efficiently produce unaliased output image pixels in a cost-effective, real-time manner. Moreover, there is a need for a system and method for implementing multi-level image resolution conversion efficiently using linear interpolation which performs image scaling for all resize factors while reducing the number of complex calculations, processing time, and amount of memory required for performing the desired resolution conversion.

SUMMARY OF THE INVENTION

It is a primary object of the present invention to overcome the aforementioned shortcomings associated with the prior art.

The present invention provides a system and method for implementing multi-level image resolution conversion efficiently using linear interpolation scaling.

The present invention further provides a system and method for implementing multi-level image resolution conversion efficiently using linear interpolation which performs image scaling for all resize factors without the need to store a large number of upsampled intermediate pixel values.

The present invention further provides a system and method for implementing multi-level image resolution conversion efficiently using linear interpolation which minimizes the number of complex calculations, the amount of processing time, and the amount of memory required for performing the resolution conversion.

These as well as additional advantages of the present invention are achieved by providing a system and method for implementing multi-level resolution conversion (MLRC) of an image efficiently using linear interpolation. Based upon a desired resolution conversion, a relationship between the number of input pixels of an input image and the number of output pixels of a converted image is determined. The system includes an equation generator for automatically generating the values of the output pixels in a real-time manner as a function of the input pixels and the desired resolution conversion. The equation generator uses linear interpolation to determine each output pixel as a weighted average of its closest respective input pixels, where each of the input pixels are utilized in forming the output pixels. As the input pixel values are received by the resolution conversion system, the output pixel values are generated in real-time at a rate required for the output resolution. In this manner, a large number of intermediate complex calculations are not required to be generated and stored in memory in order to produce the output pixel values.

In order to minimize the complexity of the calculations performed by the MLRC system, the values used in generating the output pixel values are normalized to values within a predetermined range utilized by the MLRC system. The normalized values are further shifted within the predetermined range in order to perform the function of division. When implementing linear interpolation, a floating point divider is normally required for performing division functions when calculating the weighted average of the input pixels to produce the output pixels. The MLRC system of the present invention normalizes and shifts its values in order to eliminate the need for the continual use of a floating point divider. The method of implementing multi-level image resolution conversion of the present invention allows the system to be implemented in an efficient and economical manner by eliminating the continual use of a floating point divider, minimizing the amount of memory required to perform the resolution conversion, and simplifying the calculations necessary for performing the resolution conversion.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method for implementing multi-level image resolution conversion efficiently using linear interpolation.

Figure 3:
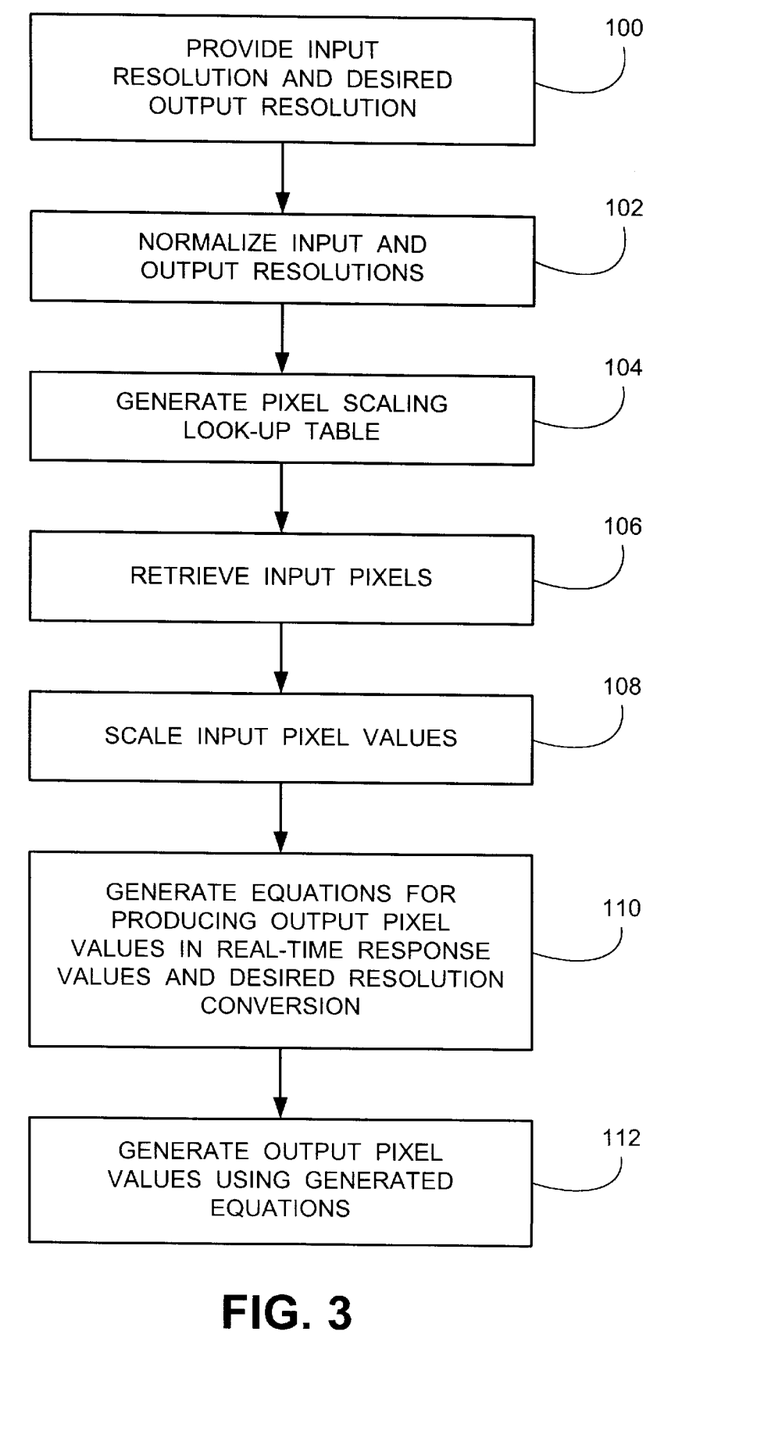
FIG. 3 is an operational block diagram of a preferred method of implementing multi-level image resolution conversion in accordance with the present invention.

Referring now to FIG. 3, an operational block diagram of a preferred method for implementing multi-level resolution conversion (MLRC) of a digital image in accordance with the present invention is illustrated. Initially in step 100, an input resolution of a multi-level digital image and a desired output resolution of the converted image are provided, where the input digital image comprises a plurality of input pixels of a first resolution and the converted image comprises a plurality of output pixels of a second resolution. The desired input and output resolutions may be input in any manner, such as by a user or the resolutions may be determined directly from an attached peripheral device having a set resolution. The input and output pixels are represented by multi-level digital values, i.e. 8-bits/pixel, indicating the particular shades of the pixels. The present invention is intended to be utilized for gray-level pixels ranging between black and white, while it is understood that the principles of the present invention can be extended to color images as well.

The input and output resolutions are normalized in step 102. By normalizing the resolution values, the computational complexity of the MLRC algorithm can be minimized while further simplifying the design of a device implementing the MLRC algorithm. A pixel scaling table is generated in step 104 using the normalized input and output resolutions provided in step 102 to establish a look-up table which is used to scale the input pixel values to values within a predetermined range utilized by the MLRC algorithm. In step 106, the input pixels are retrieved on a pixel-by-pixel basis, where only one pixel is retrieved at a time. The retrieved input pixel value is scaled in step 108 by obtaining a corresponding value from the pixel scaling look-up table for the input pixel value.

In step 110, equations for producing output pixel values are generated in a real-time manner as a function of the input pixel values and the desired resolution conversion. The equations determine each output pixel as a weighted average of its closest respective input pixels using a linear interpolation algorithm. Every input pixel is accounted for in the calculation of the output pixels. The equations for the output pixels are generated in real-time at a rate required for the output resolution, so that the generated equations determine when to provide an output pixel value and when to retrieve another input pixel value. In this manner, a large number of intermediate complex calculations are not required to be generated and stored in memory in order to generate the output pixel values. Furthermore, the entire input image does not need to be stored in advance in order to perform the MLRC, since the MLRC algorithm operates on a pixel-by-pixel basis.

In step 112, the output pixel values are generated using the equations generated in real-time. The entire MLRC algorithm is repeated until each of the input pixels are converted to respective output pixels. Since the input and output pixel values are represented by binary terms, the binary values may be simply shifted to an exponent value of two to perform multiplication or division. When implementing linear interpolation, a division function is normally required to calculate the weighted average of the input pixels to produce the output pixels. This function is typically performed by a floating point divider, which is costly to implement in hardware. By normalizing and shifting the values used in the generated equations, the MLRC of the present invention eliminates the need for the continual use of a floating point divider and minimizes the costs and computational complexity of performing the resolution conversion.

Figure 4:
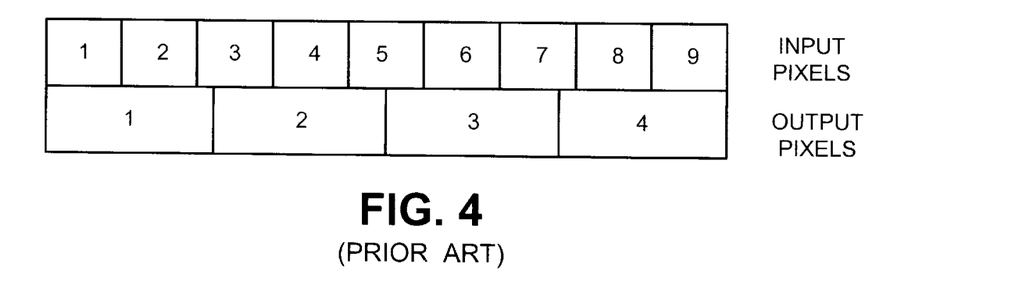
FIG. 4 shows a pixel representation of an example of the multi-level image resolution conversion performed in accordance with the present invention.

The equation generating step 110 utilizes the desired input-to-output resolution conversion to generate output pixel equations in real-time as a function of the input pixels. FIG. 4 illustrates the general approach of the MLRC algorithm when applied to the 9-to-4 pixel reduction example of FIG. 2. For the purposes of simplifying the computational complexity of the equations, each output pixel is only a function of a weighted multiple of respective input pixels resolution. A large number of intermediary values are not needed to be calculated and stored, but rather each output pixel is generated in a real-time response to the input pixels retrieved. In actuality, the equation generating step 110 uses an accumulator value to determine the amount of each input pixel to be included in each output pixel. The accumulator value is derived from the input pixel resolution $in_{norm}$ and the output pixel resolution $out_{res}$, where the accumulator value is modified as the equation generating step 110 progresses through the input and output pixels. Whenever there is a pixel operation (i.e., retrieving an input pixel or generating an output pixel), the accumulator value is modified. The equations generated for both resolution expansion and resolution reduction during the equation generating step 110 are distinct for the particular resolution conversion performed.

Resolution Expansion

For image resolution expansion, initially the input pixel resolution $in_{res}$ and the output pixel resolution $out_{res}$ are input in the multi-level resolution conversion algorithm in step 100. The accumulator value ca is initialized with a value of 0 at the first input pixel, where the accumulator value ca is then modified according the following rules:

If ca≦0,then:

$$na = ca + out_{res,} \quad (1)$$

If ca>0, then:

$$na = ca - in_{res,} \quad (2)$$

where na is the next accumulator value and ca is the current accumulator value. Whenever there is a pixel operation, the accumulator value ca is updated and na is transferred to ca. Thus, ca=0 for the first input pixel, where the accumulator value ca must then be incremented to the next accumulator value na to obtain the equation for the first output pixel. The output pixel value is then determined according to the following equations:

if $ca \geq in_{res}$, then $$op = cp, \quad (3)$$

else $$op = \frac{1}{in_{res}} (ca \cdot cp - na \cdot np) \quad (4)$$

where cp is the current input pixel value, np is the next input pixel value, and op is the output pixel value. This process is repeated until the entire input image is converted into the desired output image.

Figure 5A:
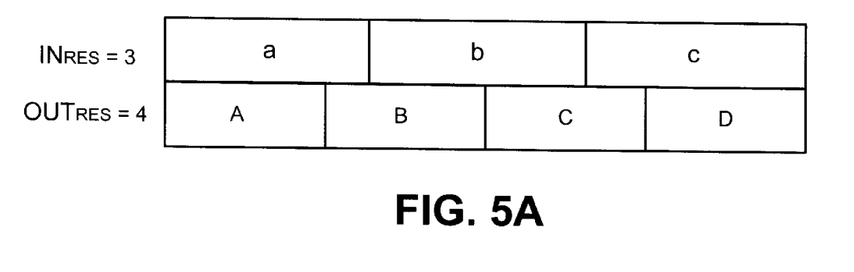
FIG. 5A is a block pixel representation of an example of expansion resolution conversion.
Figure 5B:
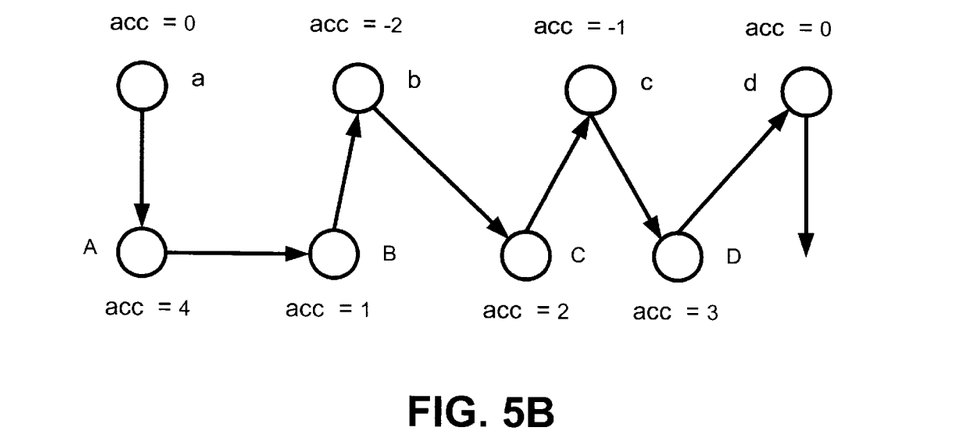
FIG. 5B is a state diagram for a state machine implementing the MLRC algorithm of the present invention for the conversion ratio shown in FIG. 5A.

Referring now to FIGS. 5A and 5B, an example of the application of above-described equations (1)–(4) is shown for the purposes of illustration. FIG. 5A illustrates the example of expanding three input pixels (a, b, c) to four output pixels (A, B, C, D), where the resolution values are $in_{res}=3$ and $out_{res}=4$. FIG. 5B illustrates a state diagram for a state machine for the MLRC algorithm as it generates output pixels for the expansion example of FIG. 5A. By inserting the specific values into equations (1)–(4), the output pixels are generated from the following equations from the state diagram of FIG. 5B:

$A=a$ $B=\frac{1}{3}(a+2b)$ $$C = \frac{1}{3}(2b + c)$$

$$D = c$$

The above equations are repeated for the remaining input pixels until the entire image is converted to respective output pixels.

The specific example described above is shown for the purposes of illustrating how the output pixel equations are generated as a function of the desired resolution conversion and the input pixels using the accumulator value ca. However, the above-described equations (1)–(4) do not take into account the normalization and scaling which is performed by the multi-level resolution conversion algorithm of the present invention in order to allow the resolution conversion to be performed more efficiently.

In order to reduce the computational complexity of the MLRC algorithm as well simplifying the implementation of the MLRC algorithm, the values used in the generated equations must be normalized and scaled to values within a predetermined range utilized by the MLRC system. The predetermined normalization range is selected based upon the desired range of scaling, such as 0.5× to 3.5×, and the desired scaling precision, such as 1% incremental steps. This scaling range and scaling precision can be achieved using a normalized output resolution of 2048 pixels. However, it is understood that the normalization range may be varied and determined according to the desired resolution conversion characteristics. Since the input pixel values and output pixels values are digital, they are represented by binary terms. Thus, the pixel values can be simply shifted in a binary context to an exponent value of 2 in order to perform division functions required for linear interpolation. These shifted values depend upon the chosen normalization. The values in the pixel scaling look-up table are initially determined and stored for the desired resolution conversion.

Equations (1)–(4) are normalized using a normalized output pixel resolution $out_{norm}$. The normalized input pixel resolution $in_{norm}$ is determined as a function of the normalized output pixel resolution:

$$in_{norm} = in_{res} * \frac{out_{norm}}{out_{res}}$$

where $in_{res}$ is the actual input pixel resolution, and $out_{res}$ is the actual output pixel resolution. The normalized values are inserted into equations (1)–(4) to create the following normalized equations:

If ca≦0, then $$na = ca + out_{norm},\quad (5)$$

If ca>0, then $$na = ca - in_{norm},\quad (6)$$

If ca≧$in_{norm}$, then $$op = cp,\quad (7)$$

else, $$op = \frac{1}{in_{norm}}(ca \cdot cp - na \cdot np) \quad (8)$$

Figure 5C:
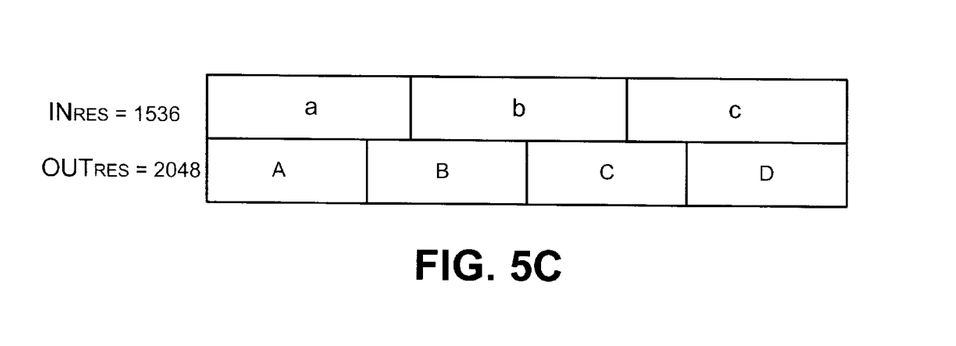
FIG. 5C is a normalized representation of the expansion resolution conversion example of FIG. 5A.
Figure 5D:
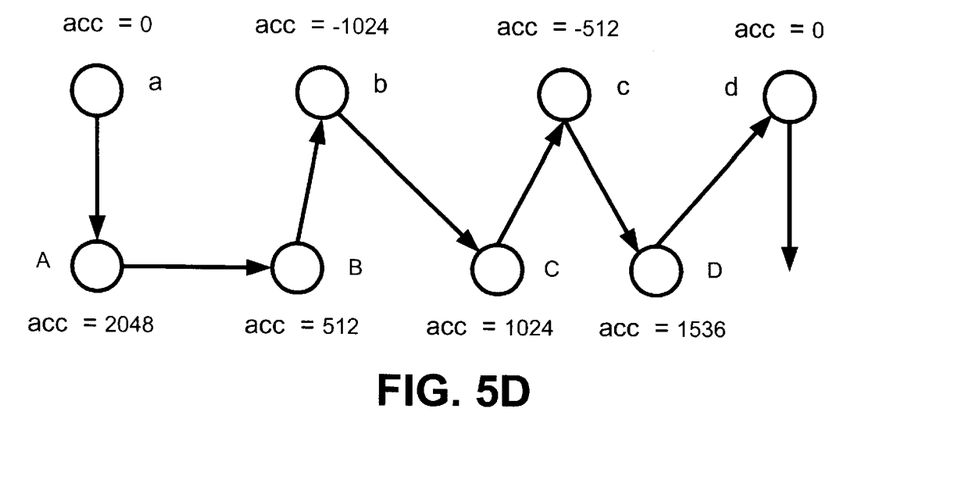
FIG. 5D is a state diagram for a state machine implementing the MLRC algorithm of the present invention for the normalized conversion ratio shown in FIG. 5C.

The remaining equations will be described based upon a normalized output pixel resolution $out_{norm}$ of 2048, which has been found to allow 1% incremental steps in resolution conversion. Referring now to FIGS. 5C and 5D, the normalization of the expansion example shown in FIGS. 5A and 5B is set forth. As can be seen for a normalized output pixel resolution $out_{norm}$ of 2048, the normalized input pixel resolution $in_{norm}$ becomes 1536 for an expansion ratio of 3 to 4. FIG. 5D illustrates the normalized state diagram for a state machine for the MLRC algorithm as it generates output pixel values for this expansion example. The values of the normalized output pixels (A, B, C, D) become:

$$A = a$$

$$B = \frac{1}{1536}(512a + 1024b)$$

$$C = \frac{1}{1536}(1024b + 512c)$$

$$D = c$$

The normalized values must further be scaled to appear within the predetermined range of values utilized by the MLRC algorithm. The input pixel values are scaled using a scale factor sf determined from the pixel scaling look-up table initially generated in step 104 for the resolution conversion. The scale factor values sf used in the pixel scaling look-up table are determined according to the following formula:

$$sf = \frac{2^x}{in_{norm}}, \quad \text{where } 0.5 < sf \leq 1$$

and the value of x is found from the following:

x

2048≦$in_{norm}$≦4096   11

1024 ≦$in_{norm}$<2048   10

512 ≦$in_{norm}$<1024   9

The accumulator values ca and na must also be shifted according to an accumulator shift value (sra) calculated as follows for image expansion:

$$sra = \text{int}\left(\frac{\log(nsw)}{\log(2)} + 1\right) - 8$$

The accumulator shift value sra is further utilized to determine a pixel shift value (srr), which is calculated by the equation:

$$srr = x - sra$$

The normalized equations (7) and (8) are then scaled and shifted to generate the following final scaled equations:
If ca≧$in_{norm}$, then $$op = \left(\frac{2^x}{in_{norm}}\right) \cdot \left(\frac{in_{norm}}{2^{sra}}\right) \cdot \left(\frac{1}{2^{srr}}\right) \cdot cp$$

else, $$op = \left(\frac{2^x}{in_{norm}}\right) \cdot \left(\frac{ca}{2^{sra}}\right) \cdot \left(\frac{1}{2^{srr}}\right) \cdot cp - \left(\frac{2^x}{in_{norm}}\right) \cdot \left(\frac{na}{2^{sra}}\right) \cdot \left(\frac{1}{2^{srr}}\right) \cdot np$$

Resolution Reduction

For image resolution reduction, the equation generating step 110 generates equations similar as those for resolution expansion with the following modifications. Initially the accumulator value ca is initialized with a value of 0 at the first output pixel, where the accumulator value ca is then modified according the following rules:

If ca≦0, then:

$$na = +in_{res}, \quad (9)$$

If ca>0, then:

$$na = ca - out_{res}, \quad (10)$$

where na is the next accumulator value and ca is the current accumulator value. Thus, ca=0 for the first output pixel, where the accumulator value ca must then be incremented to the next accumulator value na to obtain the equation for generating the first output pixel. The output pixel value is then determined according to the following equations:

if ca>$out_{res}$, then $$pp = \frac{1}{in_{res}}(out_{res} \cdot cp) + pp, \quad (11)$$

else if ca>0, then $$pp = \frac{1}{in_{res}}(ca \cdot cp) + pp \quad (12)$$

else, op=pp $$pp = \frac{1}{in_{res}}(-ca) \cdot cp \quad (13)$$

where cp is the current input pixel value, np is the next input pixel value, pp is the partial output pixel value, and op is the output pixel value. The partial output pixel value pp is initially set equal to zero for each output pixel op, where each output pixel value op is then determined as the sum of its respective partial output pixel values pp. After each output pixel value op is generated, a new partial output pixel value pp is generated in equation (13), and the partial output pixel value pp is modified as described above in equations (11) and (12) until the next output pixel value op is generated. The process is repeated until all of the output pixel values op have been generated.

Figure 6A:
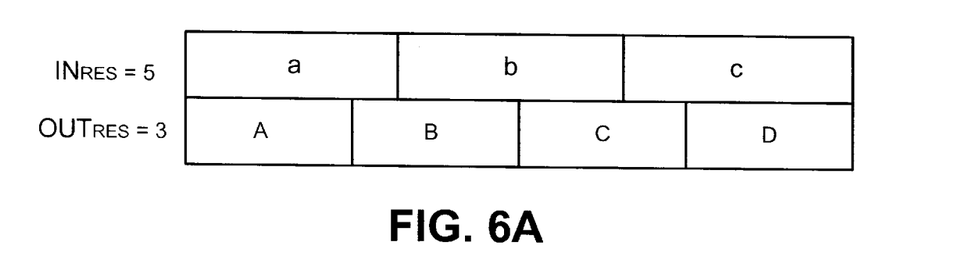
FIG. 6A is a block pixel representation of an example of reduction resolution conversion.
Figure 6B:
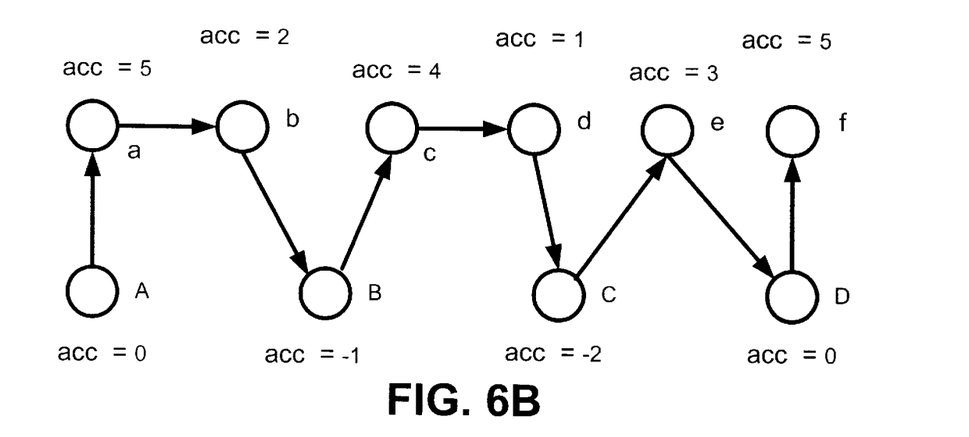
FIG. 6B is a state diagram for a state machine implementing the MLRC algorithm of the present invention for the conversion ratio shown in FIG. 6A.

Referring now to FIGS. 6A and 6B, an example of resolution reduction is illustrated for a reduction ratio of 5 input pixels (a, b, c, d, e) to 3 output pixels (A, B, C). FIG. 6B illustrates the state diagram for a state machine for the MLRC algorithm as it generates output pixel values for the reduction example of FIG. 6A. By inserting the specific values into equations (9)–(13), the following equations are obtained for the output pixels:

A=⅕(3a+2b)

B=⅕(b+3c+d)

C=⅕(2d+3e)

Again, the above-described equations (9)–(13) in the reduction example of FIGS. 6A and 6B do not take into account the normalization and scaling which is performed by the multi-level resolution conversion algorithm of the present invention in order to allow the resolution conversion to be performed more efficiently.

Equations (9)–(13) are normalized using the normalized input pixel resolution $in_{norm}$ and normalized output pixel resolution $out_{norm}$. The normalized values are inserted into equations (9)–(13) to create the following normalized equations:

if ca≦0, then:

$$na = +in_{norm}, \quad (14)$$

if ca>0, then:

$$na = ca - out_{norm}, \quad (15)$$

where the output pixels are generated as follows:

if $ca \geq out_{norm}$, then $\quad (16)$ $$pp = \frac{1}{in_{norm}}(out_{norm} \cdot cp) + pp,$$

else if ca>0, then $$pp = \frac{1}{in_{norm}}(ca \cdot cp) + pp \quad (17)$$

else, op=pp $$pp = \frac{1}{in_{norm}}(-ca) \cdot cp \quad (18)$$

Figure 6C:
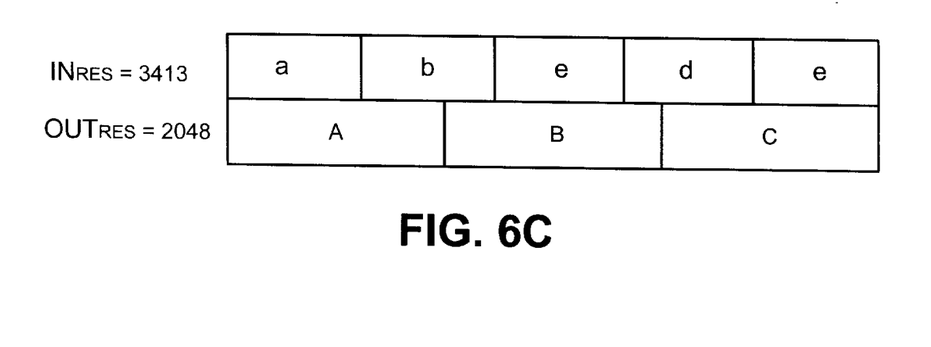
FIG. 6C is a normalized representation of the reduction resolution conversion example of FIG. 6A.
Figure 6D:
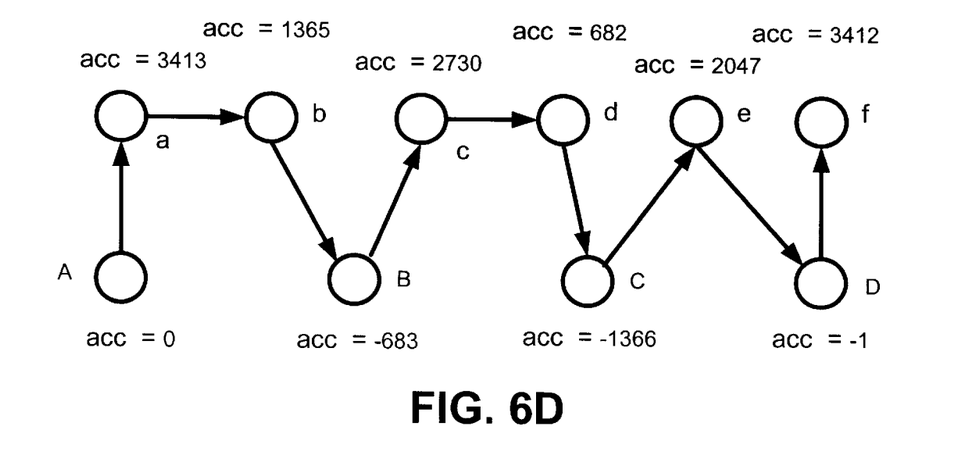
FIG. 6D is a state diagram for a state machine implementing the MLRC algorithm of the present invention for the normalized conversion ratio shown in FIG. 6C.

Referring now to FIGS. 6C and 6D, the normalization of the reduction example shown in FIGS. 6A and 6B is set forth. As can be seen for a normalized output pixel resolution $out_{norm}$ of 2048, the normalized input pixel resolution $in_{norm}$ becomes 3413 for an reduction ratio of 5 to 3. FIG. 6D illustrates the normalized state diagram for a state machine for the MLRC algorithm as it generates output pixel values for this reduction example. The values of the normalized output pixels (A, B, C) become:

$$A = \frac{1}{3413}(2048a + 1365b)$$

$$B = \frac{1}{3413}(683b + 2048c + 682d)$$

$$C = \frac{1}{3413}(1366d + 2047e)$$

The normalized values must further be scaled to appear within the predetermined range of values utilized by the MLRC algorithm. The accumulator shift value (sra) is set equal to 3 and x is set equal to 11 for image reduction. The accumulator shift value sra is further utilized to determine a pixel shift value (srr), which is calculated by the equation:

srr=x−sra

The normalized equations (16)–(18) are then scaled and shifted to generate the following final scaled equations:

If $ca \geq out_{norm}$, then $$pp = \left(\frac{2^x}{in_{norm}}\right) \cdot \left(\frac{out_{norm}}{2^{sra}}\right) \cdot \left(\frac{1}{2^{srr}}\right) \cdot cp + pp$$

else if $ca>0$, then $$pp = \left(\frac{2^x}{in_{norm}}\right) \cdot \left(\frac{ca}{2^{sra}}\right) \cdot \left(\frac{1}{2^{srr}}\right) \cdot cp + pp$$

else $op=pp$ $$pp = \left(\frac{2^x}{in_{norm}}\right) \cdot \left(\frac{-ca}{2^{sra}}\right) \cdot \left(\frac{1}{2^{srr}}\right) \cdot cp$$

Implementation of MLRC Algorithm

Figure 7:
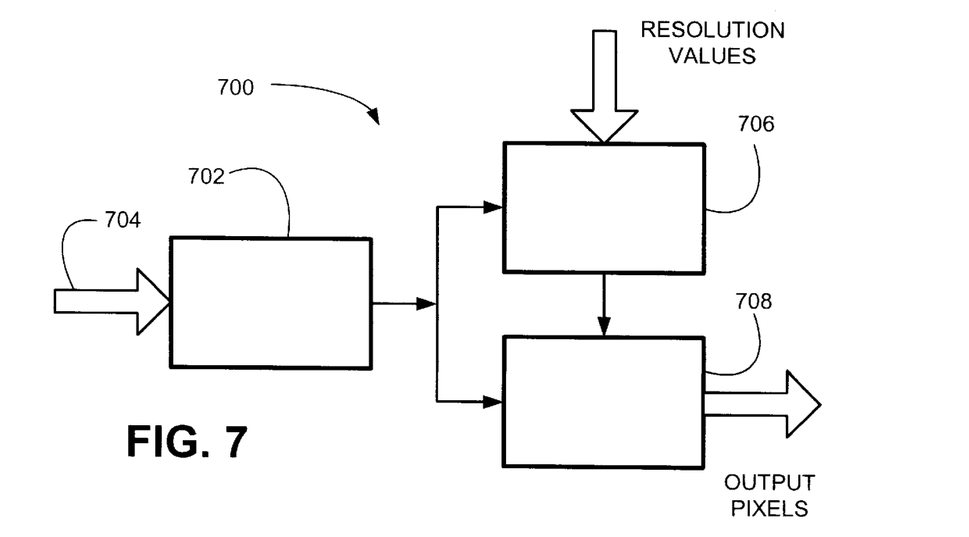
FIG. 7 is a block schematic diagram of the MLRC system of the present invention implementing the MLRC algorithm.

Referring now to FIG. 7, a system 700 for implementing the MLRC algorithm of the present invention is illustrated. The MRLC system 700 includes a pixel scaling device 702 having a data input 704 for receiving input pixel values. The pixel scaling device 702 scales the input pixel values to values appearing within a range utilized by the MLRC system 700. The pixel scaling device 702 includes the pixel scaling look-up table which is generated as a function of the normalized input and output resolutions. This pixel scaling performs the function $$\left(\frac{2^x}{in_{norm}}\right)$$

for both image expansion and reduction. The pixel scaling device 702 outputs scaled input pixel values to both a state machine 706 and an output pixel calculating device 708.

The state machine 706 performs two main functions: (1) controlling the timing of pixel operations, and (2) generating equations for the output pixel values. The MLRC system 700 performs image resolution conversion on a pixel-by-pixel basis. The state machine 706 controls pixel operations by determining when to retrieve an input pixel value and when to generate an output pixel value. The state machine 706 controls the timing of the pixel operations by monitoring the accumulator value ca as previously described. The state machine 706 further generates the equations and coefficients used for producing the output pixel values. The equations are generated in real-time in response to the desired resolution conversion and the current pixel operations. The state machine 706 receives the scaled input pixel values as well as normalized input and output resolutions as inputs. The equations and coefficients generated by the state machine 706 are output to the output pixel calculating device 708.

The output pixel calculating device 708 contains the datapath for generating the output pixel values. The output pixel calculating device 708 performs multiplication, addition, and shift functions in response to instructions received from the state machine 706. The output pixel calculating device 708 does not include a floating point divider, as the output pixel calculating device 708 uses shifting to perform the division function in accordance with the MLRC algorithm. The state machine 706 controls which calculations are performed by the output pixel calculating device 708. The output pixel calculating device 708 produces the output pixel values according to the desired resolution conversion. By performing resolution conversion on a pixel-by-pixel basis, the MLRC system does not to previously store a portion of the image being converted in memory prior to processing the image. Furthermore, performing resolution conversion on a pixel-by-pixel basis eliminates the need for a large number of intermediate values to be upsampled and stored in order to perform the desired image resolution conversion.

The MLRC algorithm of the present invention simplifies the formation of the MLRC system 700 implementing the resolution conversion by eliminating the need for a floating point divisor to implement the MLRC algorithm. The MLRC algorithm is preferably implemented by a state machine 706 fixed in hardware as a cost-effective and efficient manner of executing the MLRC algorithm. However, it is understood to those skilled in the art that other types of hardware devices, microprocessors, or software may be utilized to implement the MLRC algorithm. The combined use of a state machine with a stored lookup table eliminates the need for continued use of a floating point divider, which is costly to implement in hardware. Furthermore, the MLRC algorithm may be implemented by a state machine with a reduced computational complexity and a reduced memory requirement over previously-known resolution conversion systems.

Figure 8:
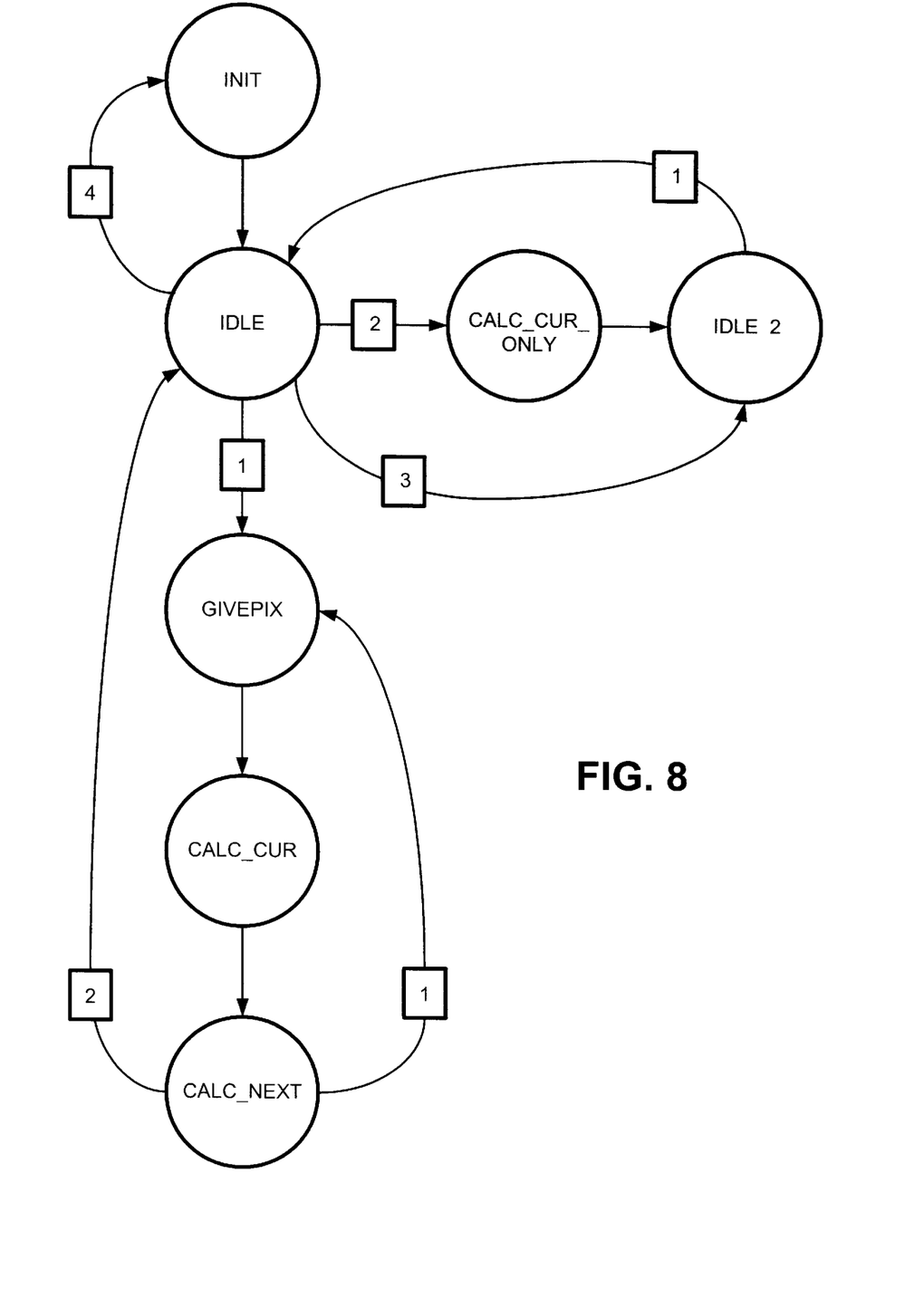
FIG. 8 is a representation of one embodiment of a state machine for implementing the MLRC algorithm of the present invention.
Figure 9A:
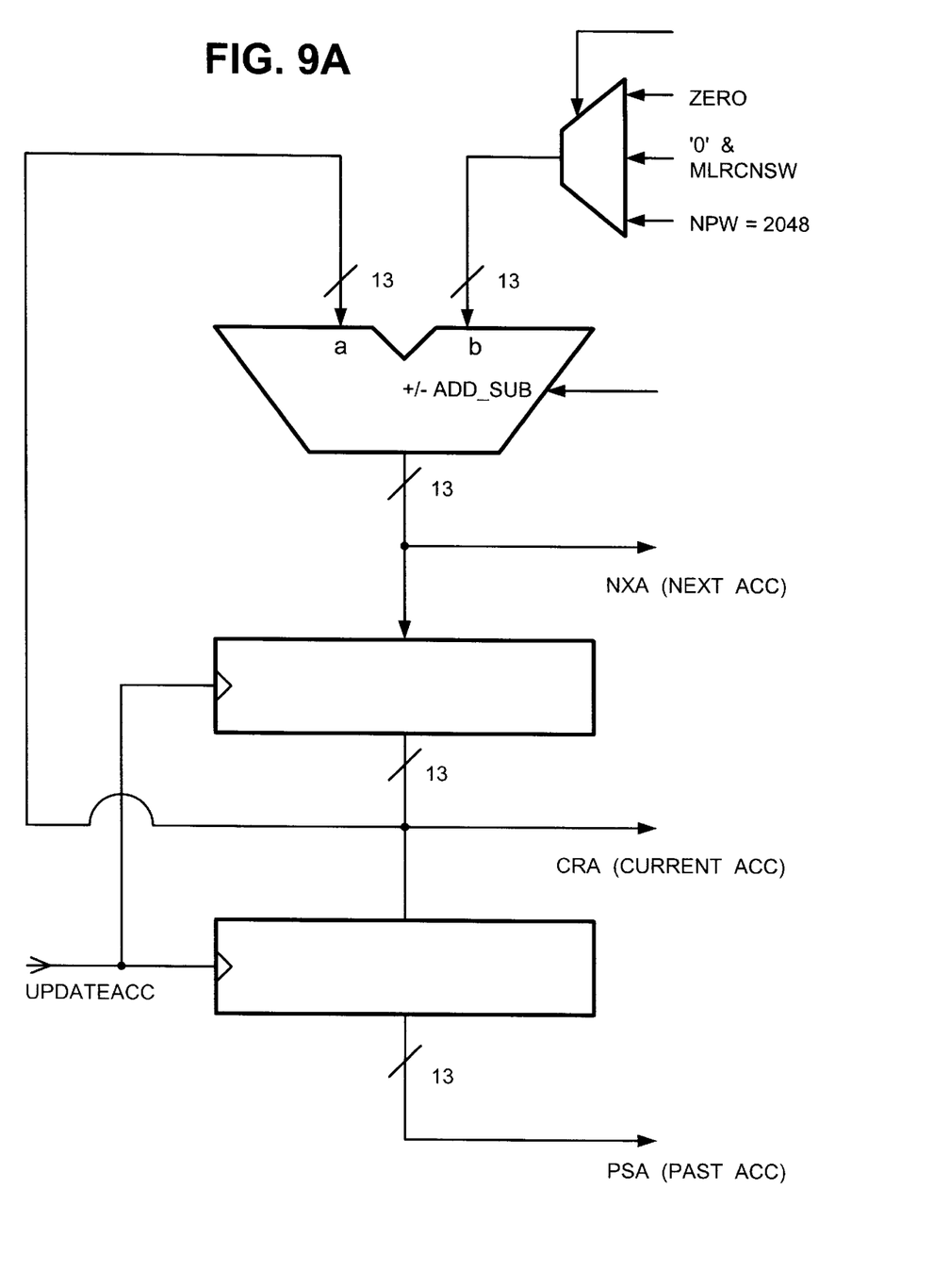
FIGS. 9A and 9B are block representations of the datapath of the data signals in the output pixel generating device of FIG. 7.
Figure 9B:
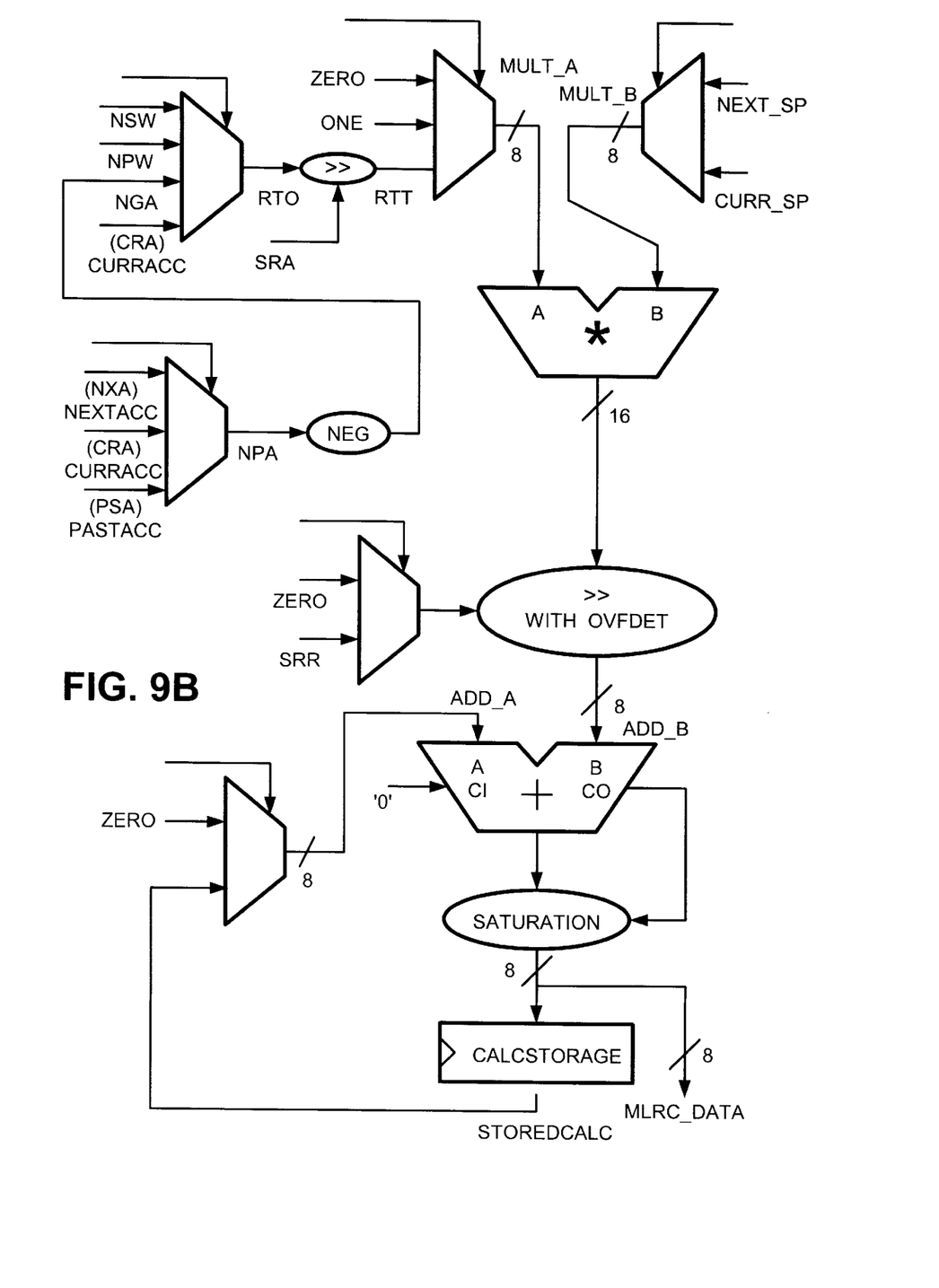

Referring now to FIG. 8, one possible embodiment of the state machine 706 in the MLRC system 700 is illustrated. The datapath in the output pixel calculating device 708 for the state machine 706 of FIG. 8 is illustrated in FIGS. 9A and 9B, where FIG. 9A shows the datapath for the accumulator whose output is used in the remaining datapath of the output pixel calculating device 708 shown in FIG. 9B. The control functions which dictate the calculations executed by the state machine 706 in its various states and conditions will be set forth below, where the control functions will be described as written in pseudo Hardware Design Language (HDL). The variables appearing in the pseudo HDL correspond to the variables described in the MLRC algorithm according to the following table.

| Variables | MLRC Description |
| --- | --- |
| calc_cur | state to perform calculation based on current input pixel |
| calc_cur_only | state to perform calculation based on current input pixel (only in reduction mode) |
| calc_next | state to perform calculation based on next input pixel |
| corr_data_rdy | input signal to indicate an incoming input pixel |
| curr_sp | value of current input pixel |
| curracc | value of current accumulator |
| curracc_t | value of current accumulator shifted right by "sra∞" |
| exp | input signal to select expansion mode |
| fifo_flush | input signal to indicate the end of line processing |
| first_pix_inp | input signal to indicate the first input pixel |
| givepix | state to provide signal for updating the accumulator |
| give_last_pix | internal signal to indicate the last input pixel (only valid when no conversion is selected) |
| i_last_pix | internal signal to indicate the last output pixel (only valid when conversion is selected) |
| idle | state after the first input pixel is detected |
| idle2 | state after calculating partial output in reduction and is waiting for the next input pixel |
| init | state to begin MLRC and is waiting for the first input pixel |
| mlrc_data | output signal to indicate the value of output pixel from MRLC |
| mlrc_data_rdy | output signal to qualify the output pixel |
| mlrcenb | input signal to enable MLRC |
| negcurracc_t | value of current accumulator inverted and shifted right by "sra" |

-continued

| Variables | MLRC Description |
| --- | --- |
| negnextacc_t | value of next accumulator inverted and shifted right by "sra" |
| negpastacc_t | value of past accumulator inverted and shifted right by "sra" |
| next_sp | value of next input pixel |
| nextacc | value of next accumulator |
| npw | input signal to set up the normalized output resolution (out$_{norm}$) |
| npw_t | value of normalized output resolution shifted right by "sra" |
| nsw | input signal to set up the normalized input resolution (in$_{norm}$) |
| nsw_t | value of normalized input resolution shifted right by "sra" |
| pastacc | value of past accumulator |
| red | input signal to select reduction mode |
| srr | input signal to set up the shift right amount for multiplication result |
| storedcalc | value of output from adder, which is also used to accumulate partial output ("pp") in reduction mode |

© Rockwell Semiconductor Systems, Inc. 1997

In FIG. 8, states are indicated by the circles with conditions for the states being indicated by the boxed numbers. The priority of the condition is set by the number appearing in the box, with '1' being the highest priority. Initially, the first input pixel is input in the 'init' state. The state machine moves on the 'idle' state, where the conditions of the 'idle' state determine which function is performed. From the 'idle' state, the next state is determined by the following conditions:

Condition 1 ((mlrcenb=0) & corr$_{13}$ data$_{13}$ rdy)
((mlrcenb=0) & give$_{13}$ last$_{13}$ pix)
((mlrcenb=1) & exp & ((corr$_{13}$ data$_{13}$ rdy & (!first$_{13}$ pix$_{13}$ inp)) (i$_{13}$ last$_{13}$ pix=1) & (nextacc>0))
((mlrcenb=1) & red & (nextacc<=npw) & (nextacc>0))

Condition 2 (mlrcenb=1) & red & (nextacc>npw)

Condition 3 (mlrcenb=1) & (i$_{13}$ last$_{13}$ pix=1)

Condition 4 fifo$_{13}$ flush=1

If the requirements of Condition 2 of the 'idle' state are met, then the state machine moves on to the 'calc$_{13}$ cur$_{13}$ only' state where the following functions are performed:

mlrc$_{13}$ data=((negcuracc$_{13}$ t*curr$_{13}$ sp)>>srr)+storedcalc;

The state machine then moves on the 'idle' state unconditionally, and will continue to 'idle' state on the following condition:

Condition 1 corr$_{13}$ data$_{13}$ rdy | (i$_{13}$ last$_{13}$ pix=1)

If Condition 1 is not met, then the state will automatically remain in 'idle2.' When Condition 1 of the 'idle' state is satisfied, the state machine moves on to the 'givepix' state which gives the current output pixel. The state machine then moves on the 'calc$_{13}$ cur' state which performs the following function:

if (mlrcenb=0)
  if (give$_{13}$ last$_{13}$ pix=0)
    mlrc$_{13}$ data=((1*curr$_{13}$ sp)>>0)+0;
  else
    mlrc$_{13}$ data=((0*curr$_{13}$ sp)>>0)+0;
else if ((mlrcenb=1) & (exp=1))
  if (curracc>=nsw) then
    mlrc$_{13}$ data=((nsw$_{13}$ t*curr$_{13}$ sp)>>srr)+0;
  else
    mlrc$_{13}$ data=((curracc$_{13}$ t*curr$_{13}$ sp)>>srr)+0
else if ((mlrcenb=1) and (red=1))

if (pastacc>=npw) then
  mlrc$_{13}$ data=((npw$_{13}$ t*curr$_{13}$ sp)>>srr)+storedcalc;
else
  mlrc$_{13}$ data=((negpastacc$_{13}$ t*curr$_{13}$ sp)>>srr)+storedcalc;

The state machine then moves on the 'calc$_{13}$ next' state which performs the following function:

if (mlrcenb=0)
  if (give$_{13}$ last$_{13}$ pix=0)
    mlrc$_{13}$ data=((0*next$_{13}$ sp)>>0)+storedcalc;
  else
    mlrc$_{13}$ data=((1*next$_{13}$ sp)>>0)+storedcalc;
else if ((mlrcenb=1) and (exp=1))
  if (curracc>=nsw) then
    mlrc$_{13}$ data=((0*next$_{13}$ sp)>>srr)+storedcalc;
  else
    mlrc$_{13}$ data=((negnextacc$_{13}$ t*next$_{13}$ sp)>>srr)+storedcalc;
else if ((mlrcenb=1) and (red=1))
  if (curracc>=npw) then
    mlrc$_{13}$ data=((npw$_{13}$ t*next$_{13}$ sp)>>srr)+storedcalc;
  else
    mlrc$_{13}$ data=((curracc$_{13}$ t*next$_{13}$ sp)>>srr)+storedcalc;

The 'calc$_{13}$ next' state further operates according the following conditions:

Condition 1 ((mlrenb 1) & exp & (nextacc>0))|corr$_{13}$ data$_{13}$ rdy

Condition 2 else idle

The variables exp and red are defined as follows:

if (npw>nsw)
  exp=1;
  red=0;
else
  exp=0;
  red 1;

The state machine 708 and its corresponding data path and pseudo HDL code are merely shown for the purposes of illustrating one possible manner of implementing the MLRC algorithm in a state machine fixed in hardware. However, it is understood to those skilled in the art that other possible state machines, hardware, or software could also be utilized for implementing the MLRC algorithm.

As can be seen from the foregoing, a system and method for implementing multi-level image resolution conversion efficiently using linear interpolation in accordance with the present invention allows image scaling to be performed for all resize factors without losing information through pixel dropping while further eliminating the need to store upsampled intermediate pixel values. Thus, the system and method for implementing the MLRC algorithm of the present invention minimizes the amount of memory and computational complexity required to perform the resolution conversion, while also performing the resolution conversion in a real-time response to the receipt of input pixels. Moreover, the system and method for performing multi-level resolution conversion using linear interpolation of the present invention can be efficiently implemented in a hardware state machine without the need for a floating point divider, which significantly reduces the production costs and complexity of the multi-level resolution conversion system.

In each of the above embodiments, the structures of the system and method for implementing multi-level resolution conversion efficiently using linear interpolation of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for implementing multi-level resolution conversion of an image of a first resolution represented by a set of input pixels into an image of a second resolution represented by a set of output pixels, comprising the steps of:

identifying the first resolution and the second resolution;

normalizing the first resolution as a function of a normalized second resolution to obtain a normalized input resolution;

generating a scaling relationship between the normalized input resolution and a normalized output resolution;

receiving the input resolution as the set of input pixels one pixel at a time;

scaling the input pixels using the scaling relationship;

generating equations in real-time for producing the set of output pixels based upon the scaled input pixels, the normalized first resolution, and the normalized second resolution, and wherein the equation generating step generates equations according to the following for resolution expansion:

if $ca \leq in_{norm}$, then $$op = \left(\frac{2^x}{in_{norm}}\right) \cdot \left(\frac{in_{norm}}{2^{sra}}\right) \cdot \left(\frac{1}{2^{srr}}\right) \cdot cp$$

else $$op = \left(\frac{2^x}{in_{norm}}\right) \cdot \left(\frac{ca}{2^{sra}}\right) \cdot \left(\frac{1}{2^{srr}}\right) \cdot cp - \left(\frac{2^x}{in_{norm}}\right) \cdot \left(\frac{na}{2^{sra}}\right) \cdot \left(\frac{1}{2^{srr}}\right) \cdot np$$

where op is the output pixel, cp is the current input pixel, np is the next input pixel, $$\frac{2^x}{in_{norm}}$$

is an input pixel scale factor, sra is an accumulator shift factor, and srr is a pixel shift factor;

creating an accumulator value to determine the amount of each input pixel to be included in each output pixel, wherein the accumulator value is derived from the normalized input and output resolutions;

modifying the accumulator value each time either an input pixel is retrieved or an output pixel is produced, wherein the accumulator value is modified for resolution expansion according to the following equations:

if $ca \leq 0$, then:

$na = +out_{norm}$;

if $ca > 0$, then:

$na = ca - in_{norm}$;

where ca is the current accumulator value, na is the next accumulator value, $out_{norm}$ is the normalized output resolution, and $in_{norm}$ is the normalized input resolution; and producing values of the output pixels from the generated equations.

2. A method for implementing multi-level resolution conversion of an image of a first resolution represented by a set of input pixels into an image of a second resolution represented by a set of output pixels, comprising the steps of:

identifying the first resolution and the second resolution;

normalizing the first resolution as a function of a normalized second resolution to obtain a normalized input resolution;

generating a scaling relationship between the normalized input resolution and a normalized output resolution;

receiving the input resolution as the set of input pixels one pixel at a time;

scaling the input pixels using the scaling relationship;

generating equations in real time for producing the set of output pixels based upon the scaled input pixels, the normalized first resolution, and the normalized second resolution, and wherein the equation generating step generates equations according to the following for resolution reduction:

if $ca \geq out_{norm}$, then $$pp = \left(\frac{2^x}{in_{norm}}\right) \cdot \left(\frac{out_{norm}}{2^{sra}}\right) \cdot \left(\frac{1}{2^{srr}}\right) \cdot cp + pp$$

else if $ca > 0$, then $$pp = \left(\frac{2^x}{in_{norm}}\right) \cdot \left(\frac{ca}{2^{sra}}\right) \cdot \left(\frac{1}{2^{srr}}\right) \cdot cp + pp$$

else $op = pp$ $$pp = \left(\frac{2^x}{in_{norm}}\right) \cdot \left(\frac{-ca}{2^{sra}}\right) \cdot \left(\frac{1}{2^{srr}}\right) \cdot cp$$

where op is the output pixel, cp is the current input pixel, np is the next input pixel, pp is the partial output pixel value, $$\left(\frac{2^x}{in_{norm}}\right)$$

is a input pixel scale factor, sra is an accumulator shift factor, and srr is a pixel shift factor;

creating an accumulator value to determine the amount of each input pixel to be included in each output pixel, wherein the accumulator value is derived from the normalized input and output resolutions;

modifying the accumulator value each time either an input pixel is retrieved or an output pixel is produced, wherein the accumulator value is modified for resolution reduction according to the following equations:

if $ca \leq 0$, then:

$na = ca + in_{norm}$;

if $ca > 0$, then:

$na = ca - out_{norm}$;

where ca is the current accumulator value, na is the next accumulator value, $out_{norm}$ is the normalized output resolution, and $in_{norm}$ is the normalized input resolution; and producing values of the output pixels from the generated equations.

3. A system for implementing a multi-level resolution conversion of an image of a first resolution represented by a set of input pixels into an image of a second resolution represented by a set of output pixels, comprising:

a pixel scaling device for receiving the input pixels and scaling the input pixels to corresponding scaled values; wherein the pixel scaling device receives the input one pixel at a time;

a pixel scaling look-up table containing a scaling relationship between a normalized first resolution and a normalized second resolution, the normalized first resolution normalized as a function of a normalized second resolution;

an equation generator arranged to receive the scaled input pixels and generate equations for producing the set of output pixels based upon the scaled input pixels received and the desired resolution conversion, and further arranged to generate equations according to the following for resolution expansion:

if ca $in_{norm}$, then $$op = \left(\frac{2^x}{in_{norm}}\right) \cdot \left(\frac{in_{norm}}{2^{sra}}\right) \cdot \left(\frac{1}{2^{srr}}\right) \cdot cp$$

else, $$op = \left(\frac{2^x}{in_{norm}}\right) \cdot \left(\frac{ca}{2^{sra}}\right) \cdot \left(\frac{1}{2^{srr}}\right) \cdot cp - \left(\frac{2^x}{in_{norm}}\right) \cdot \left(\frac{na}{2^{sra}}\right) \cdot \left(\frac{1}{2^{srr}}\right) \cdot np$$

where op is the output pixel, cp is the current input pixel, np is the next input pixel, $$\frac{2^x}{in_{norm}}$$

is an input pixel scale factor, sra is an accumulator shift factor, and srr is a pixel shift factor, and wherein the equation generator creates an accumulator value derived from the normalized input and output resolutions to determine the amount of each input pixel to be included in each output pixel, and wherein the accumulator value is modified for resolution expansion each time either an input pixel is retrieved or an output pixel is produced according to the following equations:

if ca $\leq$ 0, then:

$na = ca + out_{norm}$, if ca>0, then:

$na = ca - in_{norm}$, where ca is the current accumulator value, na is the next accumulator value, $out_{norm}$ is the normalized output resolution, and $in_{norm}$ is the normalized input resolution; and an output pixel calculating device arranged to receive the scaled input pixels from the pixel scaling device and the equations from the equation generator in order to produce the set of output pixels from the generated equations.

4. A system for implementing a multi-level resolution conversion of an image of a first resolution represented by a set of input pixels into an image of a second resolution represented by a set of output pixels, comprising:

a pixel scaling device for receiving the input pixels and scaling the input pixels to corresponding scaled values; wherein the pixel scaling device receives the input one pixel at a time;

a pixel scaling look-up table containing a scaling relationship between a normalized first resolution and a normalized second resolution, the normalized first resolution normalized as a function of a normalized second resolution;

an equation generator arranged to receive the scaled input pixels and generate equations for producing the set of output pixels based upon the scaled input pixels received and the desired resolution conversion, and further arranged to generate equations according to the following for resolution reduction:

if ca $\geq out_{norm}$, then $$pp = \left(\frac{2^x}{in_{norm}}\right) \cdot \left(\frac{out_{norm}}{2^{sra}}\right) \cdot \left(\frac{1}{2^{srr}}\right) \cdot cp + pp$$

else if ca>0, then $$pp = \left(\frac{2^x}{in_{norm}}\right) \cdot \left(\frac{ca}{2^{sra}}\right) \cdot \left(\frac{1}{2^{srr}}\right) \cdot cp + pp$$

else op=pp $$pp = \left(\frac{2^x}{in_{norm}}\right) \cdot \left(\frac{-ca}{2^{sra}}\right) \cdot \left(\frac{1}{2^{srr}}\right) \cdot cp$$

where op is the output pixel, cp is the current input pixel, np is the next input pixel, pp is the partial output pixel value, $2^x/in_{norm}$ is an input pixel scale factor, sra is an accumulator shift factor, and srr is a pixel shift factor, and wherein the equation generator creates an accumulator value derived from the normalized input and output resolutions to determine the amount of each input pixel to be included in each output pixel, and wherein the accumulator value is modified for resolution reduction each time either an input pixel is retrieved or an output pixel is produced according to the following equations:

if ca $\leq$ 0, then:

$na = ca + in_{norm}$, if ca>0, then:

$na = ca - out_{norm}$, where ca is the current accumulator value, na is the next accumulator value, $out_{norm}$ is the normalized output resolution, and $in_{norm}$ is the normalized input resolution; and an output pixel calculating device arranged to receive the scaled input pixels from the pixel scaling device and the equations from the equation generator in order to produce the set of output pixels from the generated equations.

* * * * *